United States Patent
Bocksrocker et al.

(10) Patent No.: US 11,491,583 B2
(45) Date of Patent: Nov. 8, 2022

(54) METHODS AND APPARATUSES FOR CONTROLLING CUTTING PROCESSES

(71) Applicant: TRUMPF Werkzeugmaschinen GmbH + Co. KG, Ditzingen (DE)

(72) Inventors: Oliver Bocksrocker, Stuttgart (DE); Stefanie Epple, Esslingen (DE); Tim Hesse, Ditzingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 565 days.

(21) Appl. No.: 16/189,100

(22) Filed: Nov. 13, 2018

(65) Prior Publication Data

US 2019/0084092 A1 Mar. 21, 2019

Related U.S. Application Data

(63) Continuation of application No. PCT/EP2017/060904, filed on May 8, 2017.

(30) Foreign Application Priority Data

May 13, 2016 (DE) .......................... 102016208264.7

(51) Int. Cl.
*B23K 31/10* (2006.01)
*B23K 15/08* (2006.01)
(Continued)

(52) U.S. Cl.
CPC .............. *B23K 31/10* (2013.01); *B23K 15/08* (2013.01); *B23K 26/034* (2013.01); *B23K 26/38* (2013.01);
(Continued)

(58) Field of Classification Search
CPC ...... B23K 31/10; B23K 15/08; B23K 26/034; B23K 26/38; B23K 26/0344; B23K 26/032; G01B 11/303
(Continued)

(56) References Cited

U.S. PATENT DOCUMENTS 5,041,714 A * 8/1991 Funk ........................ C21D 1/09
219/121.62
5,155,558 A * 10/1992 Tannenbaum ......... G01N 21/57
348/128

(Continued)

FOREIGN PATENT DOCUMENTS

CN 1907631 2/2007
CN 101332567 12/2008
(Continued)

OTHER PUBLICATIONS

Onuseit et al., "Space-resolved spectrometric measurements of the cutting front," Physics Procedia, Jan. 1, 2011, 12:584-90.
(Continued)

*Primary Examiner* — Jimmy Chou
(74) *Attorney, Agent, or Firm* — Fish & Richardson P.C.

(57) ABSTRACT

The disclosure relates to methods and apparatuses for controlling a cutting process in which a workpiece is cut by a high-energy beam. A process light signal is detected emanating from an interaction region of the high-energy beam with the workpiece in a first wavelength range ($\Delta\lambda 1$), in which at least one metallic constituent (Fe, Cr) of the workpiece has at least one emission line, and in a second wavelength range ($\Delta\lambda 2$), which differs from the first wavelength range, in which continuum radiation of the workpiece without emission lines is detectable. Vaporization of the at least one metallic constituent (Fe, Cr) is monitored on the basis of an intensity of the process light signal detected in the first wavelength range ($\Delta\lambda 1$) and on the basis of an (Continued)

intensity of the process light signal detected in the second wavelength range ($\Delta\lambda 2$).

19 Claims, 2 Drawing Sheets

(51) Int. Cl.
    *B23K 26/03*         (2006.01)
    *B23K 26/38*         (2014.01)

(52) U.S. Cl.
    CPC ........ *B23K 26/032* (2013.01); *B23K 26/0344* (2015.10)

(58) Field of Classification Search
    USPC ............ 219/121.36, 121.39, 121.54, 121.67, 219/121.83; 382/152; 356/445
    See application file for complete search history.

(56) References Cited

U.S. PATENT DOCUMENTS

| | | | | |
|---|---|---|---|---|
| 5,463,202 A * | 10/1995 | Kurosawa | ............ | B23K 26/032 219/121.62 |
| 7,177,032 B2 * | 2/2007 | Lex | ...................... | G01B 11/303 356/402 |
| 7,605,342 B2 | 10/2009 | Lambert et al. | | |
| 8,294,061 B2 | 10/2012 | Schmauder | | |
| 8,662,160 B2 * | 3/2014 | DeWitt | ................... | E21B 37/00 166/77.1 |
| 8,777,482 B2 * | 7/2014 | Pfitzner | ................ | B23K 26/322 374/137 |
| 8,921,733 B2 * | 12/2014 | Gaudiosi | .............. | H01C 17/242 219/121.62 |
| 9,087,674 B2 * | 7/2015 | Humphry | ................ | G01B 11/24 |
| 9,105,077 B2 | 8/2015 | Wersborg et al. | | |
| 10,058,953 B2 * | 8/2018 | Hesse | ................... | B23K 31/125 |
| 10,207,361 B2 * | 2/2019 | Spiess | ................... | B23K 26/032 |
| 2004/0188397 A1 * | 9/2004 | Connally | ............... | B23K 10/00 219/121.67 |
| 2006/0243708 A1 * | 11/2006 | Ikenoue | ............ | H01L 21/76898 219/121.62 |
| 2009/0127233 A1 * | 5/2009 | Asano | ..................... | G01N 21/73 219/121.7 |
| 2009/0319225 A1 * | 12/2009 | Mansfield | ............ | G01B 9/0209 702/170 |
| 2010/0134628 A1 * | 6/2010 | Pfitzner | ................ | B23K 26/032 348/159 |
| 2010/0326962 A1 * | 12/2010 | Calla | ..................... | B23K 9/0956 219/76.14 |
| 2011/0100967 A1 * | 5/2011 | Yoo | ....................... | B23K 26/032 219/121.73 |
| 2013/0178952 A1 | 7/2013 | Wersborg et al. | | |
| 2013/0319980 A1 * | 12/2013 | Hesse | .................... | B23K 26/38 219/121.62 |
| 2013/0319984 A1 * | 12/2013 | Linyaev | ................ | B23K 26/38 219/121.72 |
| 2014/0049779 A1 * | 2/2014 | Tin | ....................... | G01B 11/303 356/456 |
| 2014/0175071 A1 * | 6/2014 | Pfitzner | ................ | B23K 26/322 348/90 |
| 2014/0231085 A1 * | 8/2014 | Zediker | .................. | B23K 26/12 166/288 |
| 2014/0346150 A1 * | 11/2014 | Hesse | ................... | B23K 26/702 219/121.39 |
| 2016/0199941 A1 * | 7/2016 | McDowell | ........... | B23K 26/032 219/121.7 |
| 2016/0199942 A1 * | 7/2016 | Hu | ....................... | B23K 26/389 219/121.71 |
| 2016/0199943 A1 * | 7/2016 | Hu | ....................... | B23K 26/032 219/121.71 |
| 2016/0199945 A1 * | 7/2016 | McDowell | ............. | B23K 26/03 219/121.71 |
| 2017/0109874 A1 * | 4/2017 | Hallasch | ................. | B23K 26/32 |
| 2018/0059019 A1 * | 3/2018 | Chouaib | ................ | G01B 11/24 |
| 2018/0202941 A1 * | 7/2018 | Konno | ............... | G01N 21/8851 |

FOREIGN PATENT DOCUMENTS

| | | |
|---|---|---|
| DE | 37 39 862 | 6/1989 |
| DE | 43 36 136 | 7/1994 |
| DE | 101 60 623 | 6/2003 |
| DE | 10 2005 024 085 | 11/2006 |
| DE | 10 2011 003717 | 8/2012 |
| JP | 2002 079386 | 3/2002 |
| WO | WO 2012/036664 | 3/2012 |
| WO | WO 2012/143899 | 10/2012 |
| WO | WO 2015/040433 | 3/2015 |

OTHER PUBLICATIONS

Sabbaghzadeh et al., "Comparison of pulsed Nd: YAG laser welding qualitative features with plasma plume thermal characteristics," Journal of Physics D: Applied Physics, Feb. 2, 2007, 40(4):1047, 6 pages.

Schindhelm, "In-Prozess Qualitatssichening fur das Laserstrahlschneiden von Metallen", Wissenschaft Munchen, Mar. 2014, 162 pages with English abstract.

Toenshoff et al., "Controlled CO2 laser cutting on the border to beginning of plasma. InCommercial and Biomedical Applications of Ultrashort Pulse Lasers," Laser Plasma Generation and Diagnostics, International Society for Optics and Photonics, May 29, 2001, vol. 4276, 80-89.

Adelmann et al., "Optical Cutting Tear Detection System for Industrial Fiber Laser based Cutting Machines," Lasers in Manufacturing conference 2015, University Aschaffenburg, 2015, 7 pages.

International Search Report and Written Opinion in Intemtational Application No. PCT/EP2017/060904, dated Sep. 11, 2017, 25 pages (with English translation).

Powell et al., "Laser oxygen cutting of mild steel: the thermodynamics of the oxidation reaction," J. Phys. D: Appl. Phys, 2009, 42: 015504.

CN Office Action in Chinese Appln. No. 201780042859, dated Aug. 27, 2020, 10 pages (with English translation).

* cited by examiner

METHODS AND APPARATUSES FOR CONTROLLING CUTTING PROCESSES

CROSS REFERENCE TO RELATED APPLICATIONS

This application is a continuation of and claims priority under 35 U.S.C. § 120 from PCT Application No. PCT/EP2017/060904 filed on May 8, 2017, which claims priority from German Application No. DE 10 2016 208 264.7, filed on May 13, 2016. The entire contents of each of these priority applications are incorporated herein by reference.

TECHNICAL FIELD

The present invention relates to methods and apparatuses for controlling cutting processes in which workpieces are cut by a high-energy beam.

BACKGROUND

Fusion cutting with the aid of a high-energy beam, for example with the aid of a plasma beam or a laser beam, typically employs a chemically inert cutting gas, for example nitrogen or argon, which does not react with the fused metallic material in the cutting gap of the workpiece. In the case of fusion cutting, the cutting gas drives molten workpiece material downward out of the cutting gap and shields the cut edges from the surrounding air. As an alternative to the use of nitrogen or argon, (compressed) air can be used as cutting gas in the case of so-called compressed air cutting. Since more than 80% of the air consists of nitrogen, compressed air cutting likewise is a fusion cutting process. During fusion cutting, the energy of the laser beam is available only for cutting or fusing the typically metallic workpiece. By contrast, in the case of flame cutting with the aid of a high-energy beam, a reactive cutting gas, e.g., oxygen, is used. The reactive cutting gas carries out a chemical reaction with the metallic material, burning the latter.

When cutting a metallic workpiece, for example by means of a solid-state laser, there may be cutting defects including a cut interruption. By way of example, typical cutting defects can include an increased burr formation, increased edge roughness and edge inclination of the cut edges, inhomogeneous drag lines and slag build-up.

US 2013/0178952 A1 discloses a method for controlling a laser processing process and a laser processing head, in which the method is applied for control purposes. In the method, an optical spectrum of the process light or of process emissions during laser welding or during laser cutting is analyzed, wherein changes in the distribution and the intensity of the process light are related to changes in the processing process. For the purposes of analyzing the process light, the provision of three photodiodes in a laser processing head is proposed to record process emissions at different wavelengths. The three wavelength-filtered photodiodes are designed to capture process emissions in three different wavelength ranges: a first wavelength range from 1030 nm to 1080 nm serves to capture a laser back reflection, a second wavelength range between 1150 nm and 1800 nm serves to capture the temperature and a third wavelength range between 350 nm and 625 nm serves to capture metal vapor or to capture plasma radiation.

DE 43 36 136 A1 discloses a laser processing apparatus in which there is a separation of secondary light or process light from the laser beam in a resonator to capture the secondary light and the laser beam on separate detectors outside of the resonator. The observation or the capture can be implemented coaxially to the laser beam through a processing nozzle and through a laser resonator. By way of example, a camera that detects the intensity of the secondary light or the wavelength distribution of the secondary light can serve as a detector for capturing the process light.

WO 2012/143899 A1 discloses a method and an apparatus for controlling a laser cutting process, in which one or more emission lines of an emitting element are used as a reference signal, the emitting element being situated in a volume irradiated by a laser beam. At least one control parameter, which is selected from a plurality of process control parameters, is adapted on the basis of the reference signal. The emitting element can be a process gas or a metallic element contained in the material of the workpiece irradiated by the laser beam. By way of example, the metallic element can be iron, aluminum or an aluminum alloy, nickel, chromium or copper. Typically, the radiation of the metallic element is monitored in a wavelength range with a width of ±50 nm, which contains at least one emission line of the metallic element.

The article entitled, "Optical Cutting Tear Detection System for Industrial Fiber Laser-based Cutting Machines," by B. Adelmann et al., Aschaffenburg University of Applied Sciences, 2015, discloses a method for identifying a cutting tear, in which the process radiation is detected by a stacked silicon and InGaAs photodiode combination. The detected signal is subjected to high-pass filtering and the fluctuation range of the filtered signal is calculated. A cutting tear is identified in the resultant signal if the fluctuation range of the Si photodiode exceeds the fluctuation range, multiplied by a correction factor, of the InGaAs photodiode.

SUMMARY

The present disclosure relates to methods and apparatuses that facilitate monitoring of a cutting process for timely identification of cutting defects and can facilitate open-loop or closed-loop control of the cutting process that counteracts the cutting defects.

Certain aspects provide methods that include the steps of: detecting a process light signal, emanating from an interaction region of the high-energy beam with the workpiece, in a first wavelength range, in which at least one metallic constituent of the workpiece has at least one emission line, and in a second wavelength range, which differs from the first wavelength range, in which continuum radiation, (e.g., temperature radiation), of the workpiece without emission lines of the at least one metallic constituent is detectable and monitoring the cutting process, in particular monitoring a vaporization of the at least one metallic constituent, on the basis of an intensity of the process light signal detected in the first wavelength range and on the basis of an intensity of the process light signal detected in the second wavelength range.

When the workpiece is irradiated with the high-energy beam, a small proportion of the metallic material is vaporized in the interaction region, at which the high-energy beam strikes the workpiece. If there is a local vaporization of the base material of the workpiece, vaporized atoms of the metallic constituents such as, e.g., iron or chromium, are excited by a continuous irradiation by means of the high-energy beam, as a result of which the atoms emit at least one emission line or spectral line in the first wavelength range. The emission line(s) are superposed on the continuum radiation in the first wavelength range, the continuum radiation typically consisting of temperature radiation (thermal radiation) of the thermal emissions of the workpiece, more precisely of the base material of the workpiece, and, possibly, of a small proportion of further components such as back-reflected laser radiation, which likewise emanates from the workpiece. The second wavelength range is chosen in such a way that no emission lines of the metallic constituents of the workpiece lie in this wavelength range, and so the intensity of the process light signal detected in the second wavelength range can be traced back, practically exclusively, to continuum radiation, i.e., to radiation with a continuous spectrum without peaks at discrete wavelengths, in particular to temperature radiation or thermal radiation, which is similar to the emissions of a black body, more precisely a gray body. Hence, an increase in the intensity of the process light signal can be detected in the first wavelength range upon onset of local vaporization of metallic constituents of the workpiece, whereas the detected intensity of the process light signal in the second wavelength range has no change, or only a small change, in the signal curve, and so the latter can serve as a reference value. In particular, it is possible to undertake a relative comparison of the two intensities detected in the first wavelength range and in the second wavelength range, for example by virtue of forming a quotient of the two intensities.

An onset of vaporization of the workpiece, more precisely of the base material thereof, can be uniquely identified or recognized on the basis of the two intensities. It was found that the onset of vaporization of the workpiece is related to certain cutting defects, for example to an increased edge roughness of the cut edges of the cutting gap and to inhomogeneous ridges. As a result of the spectrally selective detection of the process light signal in the first wavelength range and as a result of the comparison with the process light signal in a second wavelength range, spectrally not too far away therefrom, it is possible to unambiguously deduce a process-interfering vaporization state during fusion cutting. In the case of flame cutting, too, an onset of vaporization of the workpiece material may indicate a cutting defect since there is typically no vaporization, or only minor vaporization, in the case of a quality cut during flame cutting as well. The oxidation process may be suppressed upon the onset of vaporization, and so the energy of the oxidation process is no longer available in the interaction zone; see the article "Laser oxygen cutting of mild steel: the thermodynamics of the oxidation reaction", J. Powell et al., J. Phys. D: Appl. Phys. 42 (2009) 015504.

The onset of vaporization is typically characterized by a significant increase or jump in the intensity of the process light signal detected in the first wavelength range (in relation to the second intensity, which serves as a reference). Identifying the onset of the vaporization in the interaction region facilitates a defect or quality control of the fusion cutting process, in which a deviation from a quality cut can be detected.

In one variant, the method includes adapting at least one control parameter of the cutting process depending on the process light signal detected in the first wavelength range and in the second wavelength range. In addition to defect control, there may be a timely intervention in the cutting process, when necessary, to suitably adapt one or more control parameters of the cutting process, in particular to subject the latter to open-loop or closed-loop control in such a way that the deviation from a quality cut is minimized. By way of example, the adaptation can be implemented when the intensity of the process light signal detected in the first wavelength range (in relation to the reference value) lies above an intensity threshold or when the gradient of the intensity of the process light signal detected in the first wavelength range (in relation to the reference value) exceeds a threshold, as is the case, for example, when there is a suddenly occurring increase in the intensity, which indicates the onset of vaporization of the material of the workpiece. In this way, a control can be implemented at the quality boundary of the cutting process, just below the transmission to a cutting process with a reduced cut quality (a so-called poor cut).

In an advantageous variant, the at least one control parameter is adapted in such a way that the vaporization of the at least one metallic constituent is counteracted. As described further above, this can avoid or reduce cutting defects. By way of example, it is possible to counteract the vaporization of the at least one metallic constituent by virtue of the advance speed, i.e., the relative speed between the high-energy beam and the workpiece, being reduced during the cutting process, the high-energy beam typically being aligned perpendicular to the workplace, which, as a rule, has a planar embodiment. It is understood that other control parameters of the cutting process can also be suitably adapted; by way of example, the power of the high-energy or laser beam can be increased to counteract vaporization. In a manner similar to reducing the feed rate, increasing the laser power increases the energy per unit length introduced into the workpiece. Increasing the energy per unit length leads to a steeper cutting front angle and hence to a lower locally absorbed intensity of the laser radiation, which counteracts vaporization.

In a further variant, the at least one control parameter is selected from the group comprising: advance speed, power of the high-energy beam, focal position of the high-energy beam in the direction of the beam axis, focal diameter, distance between the workpiece upper side and a cutting gas nozzle of a (laser) cutting head, and cutting gas pressure. As described further above, other control parameters of the cutting process can also be adapted to counteract the occurrence of cutting defects; by way of example, a focal position can be adapted in the direction of the beam axis, for example to modify, in particular increase, the beam diameter on the workpiece such that the intensity of the high-energy beam is reduced in the interaction region. Additionally, there can be a change in the focal diameter of the high-energy beam independently of the change in the focal position, for the purposes of which, for example, use can be made of a beam shaping device for shaping the beam profile of the high-energy beam. In certain implementations, a similar effect as in the case of the change in the focal position can be obtained by adapting the distance between the workpiece upper side and a cutting gas nozzle, which is typically part of a processing head, more precisely a cutting head for processing the workpiece. By changing the distance, it is also possible to suitably adapt the flow of a cutting gas, which is typically an inert gas or air, optionally a reactive gas, e.g., oxygen, in the cutting process described here. It is also possible to suitably adapt the cutting gas pressure, i.e., the pressure with which the cutting gas emerges from the processing nozzle, which typically lies between approximately 2 bar and approximately 20 bar in fusion cutting.

In an advantageous variant, the first wavelength range and the second wavelength range each lie in the visible wavelength range between 400 nm and 800 nm. Here, the second wavelength range typically has longer wavelengths than the first wavelength range. For the purposes of comparing the intensities of the process light signal detected in the two wavelength ranges, it was found to be advantageous for the two wavelength ranges not to have too great a distance from one another. Since the laser wavelength typically lies in the near infrared range, it is advantageous if the two wavelength ranges lie within the visible wavelength range since this can avoid unwanted interference by back reflections of the laser beam. The spectral distance between the first wavelength range and the second wavelength range should not be too small and should, in particular implementations, be at least approximately 10 nm.

In certain implementations, the first wavelength range lies between 500 nm and 550 nm, e.g., between 515 nm and 545 nm. Emission lines of iron and chromium, which, as a rule, form metallic constituents of the workpiece, lie in this wavelength range. Aluminum, too, has at least one emission line in the first wavelength range between 500 nm and 550 nm. By way of example, a wavelength filter, e.g., a bandpass filter, can serve for the detection of the process light signal in the first wavelength range, the wavelength filter selecting the first wavelength range from the wavelength spectrum of the process light signal and having a bandwidth of at most approximately 50 nm, e.g., at most approximately 30 nm, for example ±25 nm or ±15 nm, about the central wavelength of, e.g., 525 nm. In certain implementations, it is also possible to select a first wavelength range that deviates (slightly) from the aforementioned value range, the first wavelength range containing one or more emission lines of another metallic constituent of the workpiece.

In some implementations, the second wavelength range lies at wavelengths of more than 560 nm, e.g., more than 600 nm. The second wavelength range can likewise be selected from the spectrum of the process light signal with the aid of a wavelength filter, which has a spectral bandwidth of, e.g., at most 50 nm or at most 30 nm. The second wavelength range is spaced sufficiently far apart from the emission lines of metallic constituents of the workpiece, such that the process light signal detected in the second wavelength range can be substantially traced back to temperature or thermal radiation, and therefore it is only influenced to an insubstantial extent by the onset of vaporization of the metallic constituents of the workpiece. By way of example, the second wavelength range can lie in an interval between 560 nm and 610 nm, but also in another interval between 560 nm and 800 nm, for example between, e.g., 750 nm and 800 nm.

In certain implementations, the laser beam has a laser wavelength in the IR wavelength range between 800 nm and 1200 nm. In particular implementations, the laser wavelength of the laser beam is spaced sufficiently far apart from the second wavelength range such that laser radiation possibly reflected at the workpiece does not influence, or only insubstantially influences, the intensity of the process light signal detected in the second wavelength range. In particular, the laser beam can be produced by a solid-state laser, for example a disk laser, a diode laser or a fiber laser. A beam splitter device, for example in the form of a dichroic mirror, can serve to separate the process light signal from the laser beam, the beam splitter device having been introduced into the beam path of the laser beam and output coupling the process light signal from the beam path of the laser beam.

A further aspect of the invention relates to apparatuses for monitoring, in particular controlling, a cutting process on a workpiece. The apparatuses include: a focusing device for focusing a high-energy beam, in particular a laser beam, onto the workpiece, a detection device for detecting a process light signal from an interaction region of the high-energy beam with the workpiece in a first wavelength range, in which at least one metallic constituent of the workpiece has at least one emission line, and in a second wavelength range, which differs from the first wavelength range, continuum radiation, in particular temperature radiation, of the workpiece without emission lines being detectable in the second wavelength range, and a monitoring device, configured or programmed to monitor the cutting process, in particular to monitor a vaporization of the at least one metallic constituent, on the basis of an intensity of the process light signal detected in the first wavelength range and on the basis of an intensity of the process light signal detected in the second wavelength range.

In particular, the first and the second wavelength range can lie in the visible wavelength range between 400 nm and 800 nm. By way of example, the apparatus can comprise a laser cutting head, in which the focusing device, for example in the form of a focusing lens, is arranged. A wavelength-selective beam splitter device can serve to output couple the process light signal, which emanates from the interaction region between the high-energy beam and the workpiece. By way of example, the beam splitter device can be arranged in the collimated beam path of the high-energy beam between the focusing device and a collimation device and it can output couple the process light signal from the beam path of the high-energy beam to the detection device. The beam splitter device can be configured to be either transmissive or reflective for the wavelength of the laser beam, which may lie, for example, between 800 nm and 1200 nm, e.g., at approximately 1 µm, and the beam splitter device can be configured to be either reflective or transmissive for the first and second wavelength range, or optionally for a broader wavelength range, for example for a wavelength range between 500 nm and 800 nm.

The detection device typically has a further beam splitter device, which divides the process light signal into a first radiation component and into a second radiation component. By way of example, the further beam splitter device can be implemented as a perforated mirror or as a polarization beam splitter. However, it is also possible for the further beam splitter device to serve as a wavelength filter and to bring about a selection of the first wavelength range and the second wavelength range from the process light signal; by way of example, the further beam splitter device is reflective for a first radiation component in the first wavelength range and transmissive for a second radiation component in the second wavelength range, or vice versa. By way of example, the beam splitter device implemented as a wavelength filter can be implemented as a dichroic mirror.

The monitoring device monitors the cutting process on the basis of the intensities of the process light signal detected in the first and second wavelength range and thus allows a timely identification of cutting defects and, in particular, the transition from a quality cut to a cut with a poor cut quality.

In certain implementations, the apparatus includes a control device, configured to adapt at least one control parameter of the cutting process on the basis of the process light signal detected in the first wavelength range and in the second wavelength range. If the imminent occurrence of a cutting defect is identified by the monitoring device, for example on the basis of an onset of vaporization of metallic constituents of the workpiece, the control device acts on the cutting process by virtue of adapting at least one control parameter of the cutting process. In particular, the control parameters can be the control parameters described further above in conjunction with the method.

In particular implementations, the control device is configured to adapt the at least one control parameter in such a way that the vaporization of the at least one metallic constituent is counteracted. To this end, the control device can act, for example, on one or more actuating drives that serve to produce a relative movement between the laser beam and the workpiece to form a cutting gap in the workpiece, which extends along an advance direction (which is changeable depending on the location). By acting on the drive or drives, the control device can reduce the speed of the relative movement and hence the advance speed. It is understood that, as an alternative or in addition thereto, the control device also can act on other actuating devices for adapting further control parameters to counteract the local vaporization of the workpiece material and, for example, act on a laser source for producing the laser beam to increase the laser power or, optionally, to change the duty cycle in the case of a laser source operated in pulsed fashion in such a way that the pulse pauses between successive laser pulses are reduced. The control device can also act on the cutting head to set the focal position of the high-energy beam in the direction of the beam axis or set the distance between the workpiece upper side and a cutting gas nozzle of the cutting head. The control device can also act on a controllable valve, for example, to set the cutting gas pressure.

In certain implementations, the detection device is configured to select the first wavelength range of the process light signal at wavelengths between 500 nm and 550 nm, e.g., between 515 nm and 545 nm, and to select the second wavelength range of the process light signal at wavelengths of more than 560 nm, e.g., of more than 600 nm. As described further above, a beam splitter device in the form of a dichroic mirror may serve, for example, to select the first and the second wavelength range. The second wavelength range can have, in particular, a bandwidth of at most 50 nm, e.g., a smaller bandwidth, e.g., of at most 30 nm, and can lie within the wavelength range between 560 nm and 800 nm, for example in an interval between 560 nm and 610 nm or in an interval between 750 nm and 800 nm.

In certain implementations, the detection device has a first wavelength filter for selecting the first wavelength range of the process light signal and a second wavelength filter for selecting the second wavelength range of the process light signal. In place of a wavelength-selective beam splitter device, as described further above, a conventional, non-wavelength-selective beam splitter device, for example a conventional perforated mirror or a polarization beam splitter, can be used in the detector device in this case. The wavelength filters or the color filters can, as band-pass filters, have a bandwidth of at most 50 nm, for example. Bandwidths larger than 50 nm are also possible; however, smaller bandwidths, as a rule, are more advantageous.

In some implementations, the detection device has a first sensor for detecting the first wavelength range of the process light signal and a second sensor for detecting the second wavelength range of the process light signal. The first and second sensor are optical sensors, for example photodiodes or camera chips, which are sensitive to the respective wavelength range. The respective radiation component intended to be detected by the first and the second sensor can be focused onto the respective sensor with the aid of a focusing device, for example with the aid of a focusing lens, in each case. However, focusing can also be dispensed with, particularly when using sensors in the form of photodiodes.

In particular implementations, the detection device has a spatially resolving detector, in particular a camera, with a detector surface for common detection of the first wavelength range and of the second wavelength range of the process light signal. In this case, the process light signal can be divided into a first radiation component and a second radiation component at a non-wavelength-selective beam splitter device or, optionally, at a wavelength-selective beam splitter device. In the first case, the first radiation component passes through a first wavelength filter for selecting the first wavelength range and the second radiation component passes through a second wavelength filter for selecting the second wavelength range. The two radiation components are combined after filtering, for example using a dichroic mirror, and are imaged on the detector surface of the camera by a common focusing device, for example in the form of a focusing lens. Typically, the beam direction of the first and of the second radiation component differs upon focusing on the detector surface, and so the first radiation component and the second radiation component can be imaged offset from one another on the detector surface and can be detected separately. The use of a spatially resolving detector, for example a camera, is advantageous in that the detector can be additionally used for process observation or for observing the interaction region between the high-energy beam and the workpiece. Here, it is advantageous that the camera is typically sensitive to the visible wavelength range, which is particularly suitable for process observation.

Further advantages of the invention emerge from the description and the drawing. Likewise, the features specified above and the features yet to be mentioned below can find use on their own, in each case, or together in any combinations. The illustrated and described embodiments should not be construed to be a conclusive list but instead have an exemplary character for explaining the invention.

DETAILED DESCRIPTION

In the following description of the drawings, identical reference signs are used for identical or functionally equivalent components.

Figure 1A:
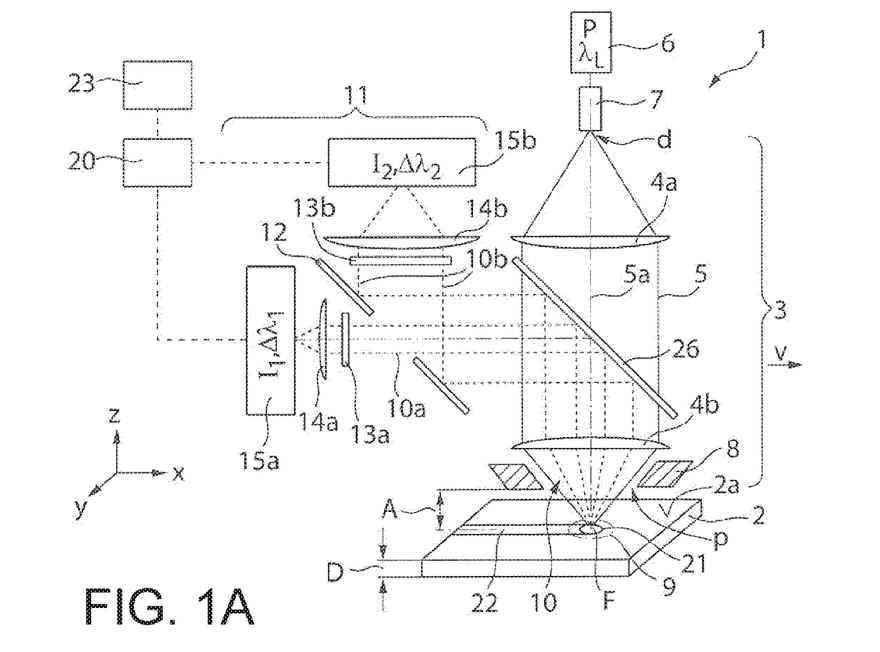
FIG. 1A shows a schematic illustration of a first exemplary embodiment of an apparatus for monitoring, in particular controlling, a cutting process, which has two optical sensors for detecting a first and a second wavelength range of a process light signal.

FIG. 1A shows an exemplary structure of an apparatus 1 for process monitoring and control of a laser cutting process on a metallic workpiece 2, which is planar in the shown example. The structure is in the form of a laser processing machine, of which FIG. 1 illustrates a laser cutting head 3 with a collimation lens 4a and with a focusing lens 4b (without a housing). In the laser cutting head 3, a laser beam 5, which is produced by a solid-state laser 6 at a laser wavelength $\lambda L$ of, e.g., approximately 1 µm, is input coupled via an optical fiber 7. The laser cutting head 3 has a cutting gas nozzle 8, through which the laser beam 5 is focused onto the workpiece 2, more precisely onto a workpiece upper side 2a or in the vicinity of the workpiece upper side 2a, by means of the focusing lens 4b. It is understood that, unlike what is shown in FIG. 1A, the apparatus 1 also can be configured for processing three-dimensional workpieces, for example chassis components, or for processing pipe-shaped workpieces.

The focused laser beam 5 strikes the workpiece 2 in an interaction region 9, at the center of which the laser beam focus F of the focused laser beam 5 is typically positioned. A process light signal 10 is produced in the interaction region 9, the process light signal emanating from the interaction region 9 and passing through the focusing lens 4b in the reverse direction such that the focusing lens 4b acts as a collimation lens for the process light signal 10. A beam splitter device in the form of a dichroic mirror 26 is arranged in the collimated beam path between the collimation lens 4a and the focusing lens 4b in the laser cutting head 3, the beam splitter device being transmissive to the laser wavelength $\lambda L$ near 1 μm, for example between 900 nm and 1100 nm, and reflective for a wavelength range between approximately 500 nm and approximately 800 nm such that the process light signal 10 in the latter wavelength range is output coupled from the laser cutting head 3 and input coupled into a detector device 11.

The detector device 11 has a (further) beam splitter device in the form of a perforated mirror 12, through the central opening of which a first radiation component 10a of the process light signal 10 passes, while a second radiation component 10b of the process light signal 10 is reflected at the perforated mirror 12. The first radiation component 10a passes through a first wavelength filter 13a in the form of a band-pass filter, which transmits a first wavelength range $\Delta\lambda 1$ of the process light signal 10 between 515 nm and 545 nm and which has a central wavelength of 530 nm (bandwidth±15 nm). The first radiation component 10a is focused onto a first optical sensor 15a by a first focusing lens 14a after passing through the first wavelength filter 13a. Accordingly, the second radiation component 10b, which was reflected at the perforated mirror 12, passes through a second wavelength filter 13b in the form of a band-pass filter, which transmits a second wavelength range $\Delta\lambda 2$ of the process light signal 10 between 750 nm and 800 nm and which has a central wavelength of 775 nm (bandwidth±25 nm). After passing through the second wavelength filter 13b, the second radiation component 10b is focused onto a second optical sensor 15b by a second focusing lens 14b.

In the shown example, the first and the second optical sensor 15a, 15b are configured as photodiodes, which are sensitive to the first and to the second wavelength range $\Delta\lambda 1$, $\Delta\lambda 2$, respectively, and that detect (in a non-spatially resolved manner) an intensity I1, I2 of the process light signal 10 in the first and second wavelength range $\Delta\lambda 1$, $\Delta\lambda 2$, respectively. Alternatively, the two optical sensors 15a, 15b can also be implemented as camera chips or the like. Additionally, a wavelength-sensitive beam splitter device, for example a dichroic mirror, can be used in place of the perforated mirror 12, the wavelength-sensitive beam splitter device transmitting the first radiation component 10a in the first wavelength range $\Delta\lambda 1$ and reflecting the second radiation component 10b in the second wavelength range $\Delta\lambda 2$, or vice versa.

Figure 1B:
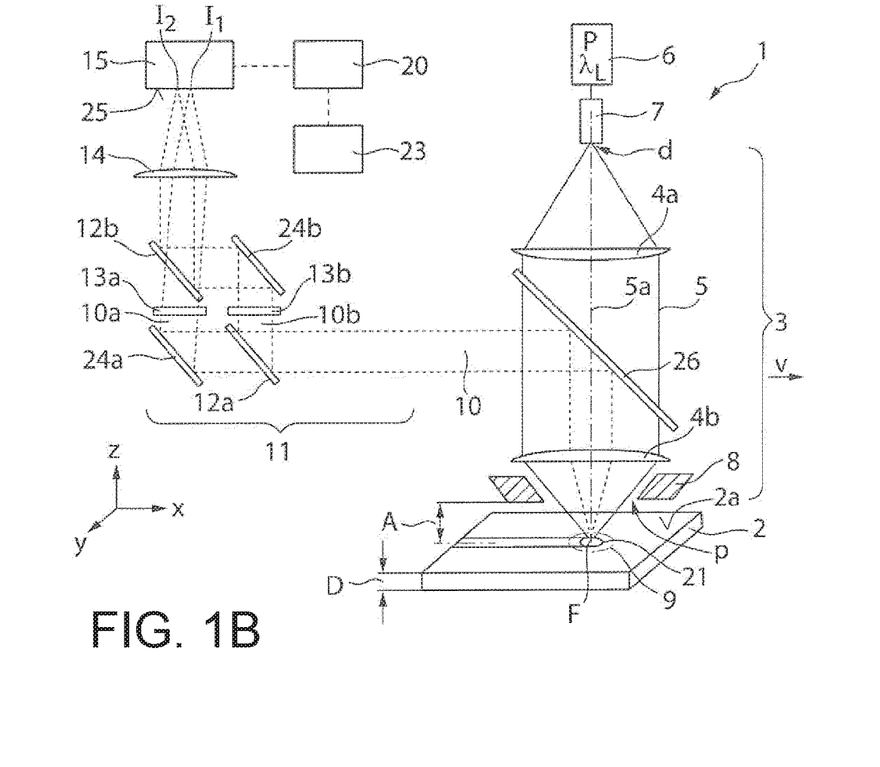
FIG. 1B shows an illustration analogous to FIG. 1A, in which a camera is used in place of the two sensors for detecting the two wavelength ranges.

FIG. 1B shows an apparatus 1 for monitoring or controlling a cutting process, which differs from the apparatus 1 shown in FIG. 1A, inter alia, by the configuration of the detection device 11, which has a spatially resolving detector 15 in the form of a camera, more precisely a CMOS camera, in place of the two sensors 15a, 15b. The detection device 11 shown in FIG. 1B has a beam splitter 12a in the form of a polarization beam splitter, where the process light signal 10 is subdivided into a first radiation component 10a and a second radiation component 10b, each with half of the radiant flux of the process light signal 10.

The first radiation component 10a is transmitted by the beam splitter 12a and deflected at a first deflection mirror 24a to a first wavelength filter 13a, which selects the first wavelength range $\Delta\lambda 1$ from the first radiation component 10a. The second radiation component 10b is reflected at the beam splitter 12a and passes through a second wavelength filter 13b, which selects the second wavelength range $\Delta\lambda 2$ from the second radiation component 10b of the process light signal 10. After passing through the second wavelength filter 13b, the second radiation component 10b is deflected at a second deflection mirror 24b and, just like the first radiation component 10a, strikes a (further) dichroic mirror 12b, which is configured to transmit the first wavelength range $\Delta\lambda 1$ and to reflect the second wavelength range $\Delta\lambda 2$. The two radiation components 10a, 10b are superposed at the dichroic mirror 12b and aligned substantially parallel to one another such that these strike a focusing lens 14 together, the two radiation components 10a, 10b being focused onto a detector surface 25 of the spatially resolving detector 15 at the focusing lens.

As may be identified in FIG. 1B, the first and second deflection mirror 24a, 24b are not aligned exactly parallel to one another, and so the first radiation component 10a strikes a different position on the detector surface 25 than the second radiation component 10b. The intensity I1 of the first radiation component 10a in the first wavelength range $\Delta\lambda 1$ and the intensity I2 of the second radiation component 10b in the second wavelength range $\Delta\lambda 2$ of the process light signal 10 can therefore be distinguished from one another in a monitoring device 20, which is connected to the detection device 11. In the structure of the detection device 11 shown in FIG. 1B, the spatially resolving detector 15 or the camera can also be used for process monitoring. To this end, it is possible to optionally remove the wavelength filters 13a, 13b and to mask one of the two radiation components 10a, 10b. In place of the spatially resolving detector 15, two sensors, e.g. two photodiodes, which are arranged at a distance from one another together in a plane corresponding to the detector surface 25 of FIG. 1A to detect a respective radiation component 10a, 10b, can be used in the structure of the detection device 11 shown in FIG. 1B.

It is understood that deviations from the structure of the detection device 11 shown in FIG. 1A and FIG. 1B are possible. By way of example, a wavelength-selective beam splitter device can be used in the structure shown in FIG. 1B in place of the polarization-selective beam splitter device 12a, the wavelength-selective beam splitter device transmitting the first wavelength range $\Delta\lambda 1$ and reflecting the second wavelength range $\Delta\lambda 2$, or vice versa. In this case, it is possible to dispense with the use of the two wavelength filters 13a, 13b. Additionally, the bandwidth of the two wavelength filters 13a, 13b is not restricted to the value ranges specified above. Thus, for example, the first wavelength range $\Delta\lambda 1$ can have a bandwidth between 500 nm and 550 nm or it can be set depending on the materials that are typically cut by the apparatus 1. Optionally, the bandwidth or the value range of the second wavelength range $\Delta\lambda 2$ also can be varied in a suitable manner; by way of example, the second wavelength range $\Delta\lambda 2$ can also lie between 560 nm and 610 nm or, in principle, it can lie in an arbitrary interval, which is as narrowband as possible, between 560 nm and 800 nm, provided no emission lines are present there.

Figure 2A:
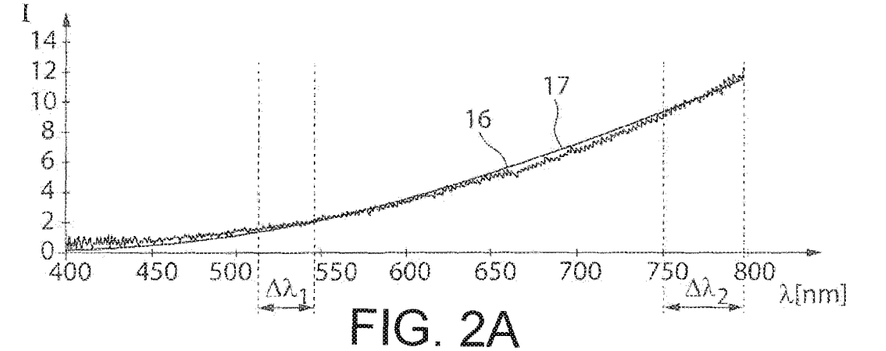
FIGS. 2A and 2B show schematic illustrations of the intensity of a process light signal as a function of the wavelength in the case of a quality cut and in the case of a poor Cut.
Figure 2B:
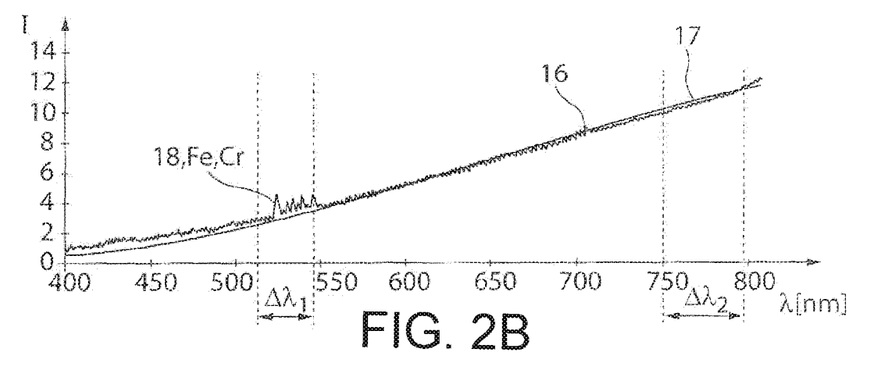

FIGS. 2A and 2B show the spectral intensity I of the process light signal 10 as a function of the wavelength λ in the case of a quality cut (FIG. 2A) and in the case of a poor cut (FIG. 2B) in the visible wavelength range between 400 nm and 800 nm for a workpiece 2 in the form of stainless steel with a thickness d of 8 mm. In the good cut shown in FIG. 2A, the intensity I of the process light signal 10 consists virtually only of continuum radiation in the form of temperature or thermal radiation 16, which substantially follows the wavelength dependence of thermal radiation 17 like in the case of a black body, more precisely like in the case of a gray body, with a temperature T of 2236 K, which is likewise illustrated in FIG. 2A.

In the example shown in FIG. 2B, the temperature radiation 16 of the process light signal 10 can be identified, superimposed on which are emission lines 18 in the first wavelength range Δλ1 between 515 nm and 545 nm, the emission lines being able to be traced back to the local vaporization of metallic constituents of the workpiece 2 in the form of Fe and Cr. In the first wavelength range Δλ1, the process light signal 10 consequently deviates significantly from the temperature radiation 17 of a black body or gray body at a temperature T of 2717 K, which is likewise illustrated in FIG. 2B. As may also be identified from FIG. 2B, no emission lines of metallic constituents of the workpiece 2 occur in the second wavelength range Δλ2, and so the temperature radiation 16 of the workpiece 2 can be detected there free from emission lines.

The monitoring device 20, which is connected to the first and the second sensor 15a, 15b, monitors the cutting process on the basis of the intensity I1 of the process light signal 10 detected in the first wavelength range Δλ1 and on the basis of the intensity I2 of the process light signal 10 detected in the second wavelength range Δλ2. As may be identified on the basis of FIGS. 2A and 2B, the intensity I2, which is detected by the second sensor 15b of the detection device 11 from FIG. 1A, is not influenced, or only influenced slightly, by the vaporization of metallic workpiece material in the interaction region 9. The intensity I2, which is detected in the second wavelength range Δλ2, can therefore serve as a reference value for the intensity I1, which is detected by the first sensor 15a in the first wavelength range Δλ1.

A local vaporization of metallic constituents, e.g. in the form of Fe or Cr, of the workpiece 2 can be determined on the basis of an evaluation of the two intensities I1, I2, for example on the basis of forming a quotient IR=I1/I2 (relative intensity) between the intensity I1 in the first wavelength range Δλ1 and the intensity I2 in the second wavelength range Δλ2, which is undertaken in the monitoring device 20. The vaporization of the metallic constituents of the workpiece 2 is an indicator for cutting defects, which occur during a cutting process, which is described in more detail below.

As may be identified in FIG. 1A, there is, within the cutting process, a relative movement between the workpiece 2 and the cutting gas nozzle 8 or the laser cutting head 3 as a result of moving the cutting gas nozzle 8 or the laser cutting head 3 along the positive X-direction. As an alternative or in addition thereto, the workpiece 2 can be moved in the opposite direction (negative X-direction) relative to the nozzle 8 or to the laser cutting head 3. In any case, there is a relative movement between the workpiece 2 and the laser cutting head 3 with a relative speed referred to as advance speed v. In the cutting process, a cutting front 21 forms in the leading region of the interaction region 9, the latter being adjoined by a cutting gap 22 (occasionally also referred to as a kerf below) in the trailing region (in the negative X-direction).

In a cutting process, cutting defects, for example in the form of increased edge roughness at the cut edges of the cutting gap 22 or increased formation of burrs, may occur when metallic constituents of the workpiece 2 are vaporized. Such cutting defects occur if the advance speed v becomes so large that local vaporization of metallic constituents of the workpiece 2, for example of Fe and Cr, occurs. By way of example, the wavelength-dependent intensity I in the case of a quality cut (without local vaporization), as illustrated in FIG. 2A, only differs from the wavelength-dependent intensity I in the case of a poor cut (with local vaporization), as illustrated in FIG. 2B, in that an advance speed v of 1.1 m/min was selected in FIG. 2A and an advance speed v of 1.2 m/min was selected in FIG. 2B.

Figure 3:
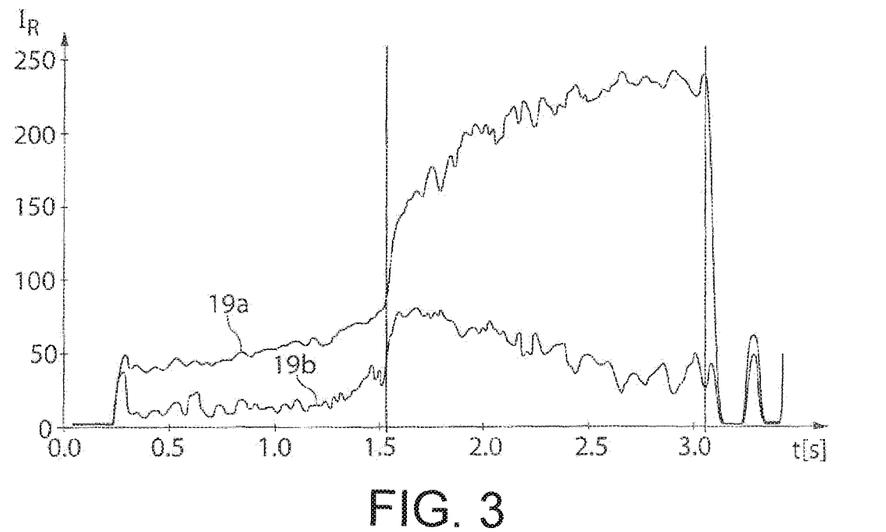
FIG. 3 shows schematic illustrations of a time profile of the moving average or of the moving standard deviation of a relative intensity signal when increasing the advance speed of the cutting process.

The influence of the advance speed v on the relative intensity IR formed by the two detected intensities I1, I2 in the monitoring device 20 is illustrated in FIG. 3 as a function of time t. In the example shown in FIG. 3, the advance speed v is increased continuously (linearly) with increasing time duration from a start time t0=0. As may be identified in FIG. 3 on the basis of a first intensity curve 19a, which represents the moving mean value of the relative intensity IR, there is a significant increase in the relative intensity IR, i.e., an intensity jump, with increasing advance speed v after a time of t=1.5 seconds, which is marked by a vertical line in FIG. 3. This increase can be traced back to the onset the local vaporization of the metallic workpiece 2. There is a quality cut in the region situated to the left of the increase in FIG. 3, i.e., at smaller advance speeds v, with a poor cut in the region situated to the right of the vertical line. The second intensity curve 19b shown in FIG. 3, which represents the moving standard deviation of the relative intensity IR, also experiences higher dynamics and therefore increases. There is a significant reduction in the detected relative intensity IR in FIG. 3 in the case of a further increase of the advance speed v. However, the reduction in the detected relative intensity IR can be traced back to an overload of the sensor, which is caused by a strong increase in the relative intensity IR on account of a cut tear, in which the workpiece 2 is no longer completely severed by the laser beam 5.

To prevent cutting defects or to avoid a poor cut, which can be determined by the monitoring device 20, a control device 23 is arranged in the apparatus 1 of FIG. 1A, the control device 23 being connected to the monitoring device 20 and being configured or programmed to adapt at least one control parameter of the laser cutting process on the basis of the intensity I1 of the process light signal 10 detected in the first wavelength range Δλ1 and on the basis of the intensity I2 of the process light signal 10 detected in the second wavelength range Δλ2.

By way of example, adapting the at least one control parameter by the control device 23 can be implemented when the relative intensity IR lies above a threshold; however, it can be more advantageous to undertake the adaptation when the (positive) gradient or the time derivative of the relative intensity IR exceeds a threshold since a fast increase in the relative intensity IR represents an indication for a transition between a quality cut and a poor cut, as may be identified in FIG. 3.

To adapt the at least one control parameter, the control device 23 acts on one or more devices of the apparatus 1, which influence the cutting process. In particular, the control device 23 can act on a drive (not represented pictorially) of the apparatus 1, the drive moving the laser cutting head 3 over the workpiece 2. Here, the control device 23 can reduce the advance speed v of the relative movement between the laser cutting head 3 and the workpiece 2 and thus counteract the vaporization of the metallic constituents Fe, Cr of the workpiece 2.

As an alternative or in addition thereto, the control device 23 can also adapt other control parameters; by way of example, the control device 23 can act on the laser source 6 to increase the power P of the laser beam 5 or, optionally, act on an actuating drive of the focusing lens 4b to displace the latter along the beam axis 5a of the laser beam 5 and thus change the focal position F of the laser beam 5 along the beam axis 5a, as a result of which the beam diameter of the laser beam 5 can be adapted on the workpiece 2. As a result of increasing the diameter of the laser beam 5 on the workpiece 2, it is typically likewise possible to counteract a vaporization of metallic constituents Fe, Cr of the workpiece 2. Alternatively, or in addition thereto, it is also possible to set the focal diameter d of the laser beam 5, for example by virtue of beam shaping being undertaken at the light output surface of the optical fiber 7, the beam shaping suitably adapting the beam profile of the laser beam 5 and hence the focal diameter d.

Additionally, or as an alternative thereto, the control device 23 can also be configured or programmed to act on an actuating drive of the laser cutting head 3 to set a distance A between the cutting gas nozzle 8 and the workpiece 2 to influence the flow of an inert cutting gas used during fusion cutting, for example in the form of argon or nitrogen, in such a way that the vaporization of the metallic constituents Fe, Cr of the workpiece 2 is counteracted. It is also possible to adapt the cutting gas pressure p, at which the cutting gas is made available to the fusion cutting processes by the apparatus 1 or at which the cutting gas emerges from the cutting gas nozzle 8, with the aid of the control device 23 to counteract vaporization. As a rule, the (static) cutting gas pressure p lies between approximately 2 bar and approximately 20 bar during fusion cutting and it can be set by way of a valve, for example.

In particular, the control device 23 can also be configured or programmed to regulate the cutting process. Ideally, closed-loop control is brought about in such a way that the cutting process always remains at the boundary, shown in FIG. 3, at the transition between a quality cut and a poor cut, specifically just below this boundary in the ideal case. To this end, the control device can set the advance speed v, for example, and/or other control parameters in such a way that the relative intensity IR shown in FIG. 3 is always set or controlled to just below this boundary such that a process control of the cutting process is implemented at the quality boundary. In contrast to such control at the start of the occurrence of a poor cut, the prior art, as a rule, only identifies or detects the occurrence of a cut tear; i.e., there is only an open-loop or closed-loop control intervention in the cutting process when a poor cut is already present. The above-described cutting process, in which there is an open-loop or closed-loop control intervention, is a fusion cutting process. However, the apparatus can also serve to carry out a flame cutting process using a reactive cutting gas, for example in the form of oxygen. In a flame cutting process, too, there can be an open-loop or closed-loop control intervention in the case of an onset of vaporization of the workpiece material since the onset of vaporization of the workpiece material also represents an indication for a poor cut in the case of a flame cutting process.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of monitoring a cutting process in which a workpiece is cut by a high-energy beam, the method comprising:
    detecting a process light signal, emanating from an interaction region of the high-energy beam with the workpiece, in a first wavelength range, in which at least one metallic constituent of the workpiece has at least one emission line, and in a second wavelength range, which differs from the first wavelength range, in which continuum radiation of the workpiece without emission lines is detectable, and
    identifying vaporization of the at least one metallic constituent, on the basis of a comparison between an intensity value of the process light signal detected within the first wavelength range and an intensity value of the process light signal detected within the second wavelength range, wherein the comparison comprises forming a quotient of the intensity value of the process light signal detected within the first wavelength range and the intensity value of the process light signal detected within the second wavelength range.

2. The method of claim 1, further comprising: adapting at least one control parameter comprising at least one of: advance speed, power of the high-energy beam, focal position of the high-energy beam along its beam axis, focal diameter, distance between an upper side of the workpiece and a cutting gas nozzle of a cutting head, and cutting gas pressure of the cutting process, depending on the comparison between the intensity of the process light signal detected within the first wavelength range and the intensity of the process light signal detected within the second wavelength range.

3. The method of claim 1, wherein the high-energy beam is a laser beam.

4. The method of claim 1, wherein the at least one control parameter is adapted in such a way that the vaporization of the at least one metallic constituent is counteracted.

5. The method of claim 1, wherein the first wavelength range and the second wavelength range each lie in the visible wavelength range between 400 nm and 800 nm.

6. The method of claim 1, wherein the first wavelength range lies between 500 nm and 550 nm.

7. The method of claim 6, wherein the first wavelength range lies between 515 nm and 545 nm.

8. The method of claim 1, wherein the second wavelength range lies at wavelengths of more than 560 nm.

9. The method of claim 1, wherein the laser beam has a laser wavelength in the IR wavelength range between 800 nm and 1200 nm.

10. The method according to claim 1, wherein the at least one metallic constituent comprises one or both of iron or chromium.

11. An apparatus for controlling a cutting process on a workpiece, comprising:
    a focusing device for focusing a high-energy laser beam onto the workpiece,
    a detection device for detecting a process light signal from an interaction region of the high-energy beam with the workpiece in a first wavelength range, in which at least one metallic constituent of the workpiece has at least one emission line, and in a second wavelength range, which differs from the first wavelength range, in which continuum radiation of the workpiece without emission lines is detectable, and a monitoring device, configured to monitor vaporization of the at least one metallic constituent, on the basis of a comparison between an intensity value of the process light signal detected in the first wavelength range and on the basis of an intensity value of the process light signal detected in the second wavelength range, wherein the comparison comprises forming a quotient of the intensity value of the process light signal detected in the first wavelength range and the intensity value of the process light signal detected in the second wavelength range.

12. The apparatus of claim 11, further comprising:
a control device, configured to adapt at least one control parameter of the cutting process on the basis of the process light signal detected in the first wavelength range and in the second wavelength range.

13. The apparatus of claim 12, wherein the control device is configured to adapt the at least one control parameter in such a way that the vaporization of the at least one metallic constituent is counteracted.

14. The apparatus of claim 11, wherein the detection device is configured to select the first wavelength range of the process light signal at wavelengths between 500 nm and 550 nm.

15. The apparatus of claim 14, wherein the detection device is configured to select the first wavelength range of the process light signal at wavelengths between 515 nm and 545 nm, and to select the second wavelength range of the process light signal at wavelengths of more than 560 nm.

16. The apparatus of claim 11, wherein the detection device has a first wavelength filter for selecting the first wavelength range of the process light signal and a second wavelength filter for selecting the second wavelength range of the process light signal.

17. The apparatus of claim 11, wherein the detection device has a first sensor for detecting the first wavelength range of the process light signal and a second sensor for detecting the second wavelength range of the process light signal.

18. The apparatus of claim 11, wherein the detection device has a spatially resolving detector, in particular a camera, with a detector surface for common detection of the first wavelength range and of the second wavelength range of the process light signal.

19. A method of controlling a cutting process in which a workpiece is cut by a high-energy beam, the method comprising:

detecting a process light signal, emanating from an interaction region of the high-energy beam with the workpiece, in a first wavelength range, in which at least one metallic constituent of the workpiece has at least one emission line, and in a second wavelength range, which differs from the first wavelength range, in which continuum radiation of the workpiece without emission lines is detectable, and monitoring a vaporization of the at least one metallic constituent, on the basis of a comparison between an intensity of the process light signal detected in the first wavelength range and on the basis of an intensity of the process light signal detected in the second wavelength range, wherein the comparison comprises forming a quotient of the intensity value of the process light signal detected within the first wavelength range and the intensity value of the process light signal detected within the second wavelength range; and adapting at least one control parameter comprising at least one of: advance speed, power, focal position, focal diameter, distance, and gas pressure of the cutting process depending on the intensity of the process light signal detected in the first wavelength range and the intensity of the process light signal detected in the second wavelength range.

* * * * *